(12) United States Patent
Kondo et al.

(10) Patent No.: US 8,804,038 B2
(45) Date of Patent: Aug. 12, 2014

(54) INFORMATION PRESENTATION DEVICE AND INFORMATION PRESENTATION METHOD

(75) Inventors: Tetsujiro Kondo, Tokyo (JP); Kazutaka Uchida, Tokyo (JP)

(73) Assignee: Sony Coporation, Tokyo (JP)

( * ) Notice: Subject to any disclaimer, the term of this patent is extended or adjusted under 35 U.S.C. 154(b) by 320 days.

(21) Appl. No.: 12/673,117

(22) PCT Filed: Jun. 18, 2008

(86) PCT No.: PCT/JP2008/061132
§ 371 (c)(1),
(2), (4) Date: Feb. 11, 2010

(87) PCT Pub. No.: WO2009/025121
PCT Pub. Date: Feb. 26, 2009

(65) Prior Publication Data
US 2011/0205436 A1  Aug. 25, 2011

(30) Foreign Application Priority Data
Aug. 21, 2007  (JP) ................................ 2007-215172

(51) Int. Cl.
*H04N 5/44* (2011.01)

(52) U.S. Cl.
USPC ............. 348/553; 348/588; 348/571; 725/10; 725/12; 345/1.1; 345/1.3

(58) Field of Classification Search
USPC ........... 348/553, 588, 571, 14.07; 725/10, 12; 345/1.1, 1.3
See application file for complete search history.

(56) References Cited

U.S. PATENT DOCUMENTS 5,977,976 A * 11/1999 Maeda .......................... 715/841
7,174,029 B2 * 2/2007 Agostinelli et al. .......... 382/100
(Continued)

FOREIGN PATENT DOCUMENTS

| JP | 8 84302 | 3/1996 |
| JP | 8-84302 | 3/1996 |

(Continued)

OTHER PUBLICATIONS

European Search Report issued Feb. 21, 2011, in Patent Application No. 08777331.3-2202 / 2180707.

(Continued)

*Primary Examiner* — Jefferey Harold
*Assistant Examiner* — Humam Satti
(74) *Attorney, Agent, or Firm* — Oblon, Spivak, McClelland, Maier & Neustadt, L.L.P.

(57) ABSTRACT

An information processing section that outputs video images with settings based on variables respectively provided to individual display sections of a plurality of display sections is included, and a video image is output to any display section from this information processing section. A setting of the video image output to the any display section is changed, and a response of a viewer at that time is obtained by a response obtaining device. Then, in accordance with the response information of the viewer obtained by this response obtaining device, a display section in which a setting of the video image is to be changed and the setting of the video image are determined by a stimulus response estimation section, and information of the display section in which the setting of the video image is to be changed and a variable based on the setting of the video image are output to the information processing section.

9 Claims, 7 Drawing Sheets (56) References Cited

U.S. PATENT DOCUMENTS

| | | |
|---|---|---|
| 2005/0047629 A1 | 3/2005 | Farrell et al. |
| 2005/0174482 A1* | 8/2005 | Yamada et al. ............... 348/383 |
| 2006/0093998 A1* | 5/2006 | Vertegaal ..................... 434/236 |
| 2006/0112334 A1* | 5/2006 | Endrikhovski et al. ....... 715/700 |
| 2006/0250529 A1* | 11/2006 | Kondo et al. ................. 348/739 |
| 2006/0256133 A1 | 11/2006 | Rosenberg |
| 2007/0247717 A1* | 10/2007 | Konno et al. ................. 359/613 |
| 2008/0068285 A1* | 3/2008 | Kondo et al. ................. 345/1.1 |
| 2009/0085830 A1* | 4/2009 | Imai et al. ..................... 345/1.1 |
| 2010/0007796 A1* | 1/2010 | Yamaji et al. ................. 348/588 |
| 2010/0111491 A1* | 5/2010 | Kamoto ......................... 386/66 |
| 2010/0156757 A1* | 6/2010 | Naito et al. .................... 345/1.1 |
| 2010/0328492 A1* | 12/2010 | Fedorovskaya et al. ... 348/231.2 |

FOREIGN PATENT DOCUMENTS

| | | |
|---|---|---|
| JP | 10-243351 | 9/1998 |
| JP | 10 243351 | 9/1998 |
| JP | 2006 333340 | 12/2006 |
| JP | 2006-333340 | 12/2006 |

OTHER PUBLICATIONS

Office Action issued Apr. 10, 2012, in Japanese Patent Application No. 2007-215172.

Japanese Office Action Issued Jun. 26, 2012 in Patent Application No. 2007-215172.

* cited by examiner

FIG. 9

INFORMATION PRESENTATION DEVICE AND INFORMATION PRESENTATION METHOD

TECHNICAL FIELD

The present invention relates to an information presentation device and an information presentation method which adjust, for example, amounts or contents of information to be presented on a plurality of display devices so that the amounts or contents become equal or the same.

BACKGROUND ART

Heretofore, when a plurality of programs or reproduction video images have been viewed concurrently on a plurality of screens (display devices), the amount of information that can be obtained within a unit of time has generally varied in the individual programs or reproduction video images, thereby causing a deviation of information among screens. Considering efficiency of obtaining information, presenting an equal amount of information on each screen enhances the efficiency of obtaining information and convenience for users, and thus is more desirable. In a case of making information amounts uniform among programs displayed on respective screens, the information amounts can be matched to one another by respectively adjusting the reproduction speeds of the programs.

For example, in Japanese Unexamined Patent Application Publication No. 10-243351 issued by the Japan Patent Office, a technique is proposed in which video image features are detected in a video image containing moving images and sound and the video image is reproduced while the reproduction speed is being automatically adjusted in accordance with the video image features.

However, in general, since the information amount of a program or a reproduction video image is significantly affected by a standard of value of a recipient, it is difficult to determine the information amount by mechanical determination alone to change the reproduction speed.

For example, it has been considered that, by using a measurement device, such as, those of an electroencephalograph, an electrocardiogram, or NIRS (Near-Infrared Spectroscopy), an internal state of a viewer can be estimated on the basis of obtained waveforms or data to change the reproduction speed of a program or a reproduction video image. However, since a method that uses such a measurement device requires a large apparatus, a burden on a user (viewer) is increased and thus it is difficult to use such a method as measurement means on a daily basis. In addition, since it is expensive to provide a measurement device such as those mentioned above, ordinary viewers cannot make use of the device.

Further, as in the abovementioned method using a measurement device, in a case where an internal state of a viewer is estimated by using a response of the body of the user made when an object of interest such as a video image is presented, various factors may cause bodily responses, and thus it is difficult to specify the causes of the bodily responses and specify an internal state of the user.

Furthermore, in a case where an internal state of a user is attempted to be estimated by using a method that does not place the user under constraints in order to reduce a burden on the user, it is difficult to obtain a desired response of the user.

The present invention is provided in view of the above-described problems. It is an object of the present invention to adjust the content or amount of information to be presented on each screen on the basis of an involuntary response provided by a user with fewer burdens on the user.

DISCLOSURE OF INVENTION

The present invention is characterized by including an information processing section that outputs video images with settings based on variables respectively provided to individual display sections of a plurality of display sections, and a stimulus response estimation section that determines a display section in which a setting of a video image is to be changed and the setting of the video image in accordance with response information of a viewer obtained by a response obtaining device that obtains a response of the viewer when a setting of a video image output to any display section has been changed, and that outputs information of the display section in which the setting of the video image is to be changed and a variable based on the setting of the video image to the information processing section.

According to the above-described configuration, a display content of a display section is temporarily changed, response information of a user at that time is obtained, and the amount or content of information to be presented can be adjusted so that an appropriate information presentation is provided for the user in accordance with the response information.

According to the present invention, the amount and content of information to be presented on each screen can be adjusted on the basis of an involuntary response provided by a user with fewer burdens on the user. Furthermore, since an involuntary response to a change in the information amount or content of information to be presented on a display device is obtained, an internal state of the user can be estimated without burdening the user.

BEST MODE FOR CARRYING OUT THE INVENTION

Hereinafter, an embodiment of the present invention will be described with reference to the accompanying drawings.

The embodiment described below is a preferred example of the present invention and thus various technically preferred limitations are placed thereon. The scope of the invention, however, is not limited to these modes unless otherwise specified in the following description. For example, a numerical condition of each of parameters to be cited in the following description is merely a preferred example, and the sizes, shapes and arrangement relationships in the individual drawings used in the description are also schematic.

Figure 1:
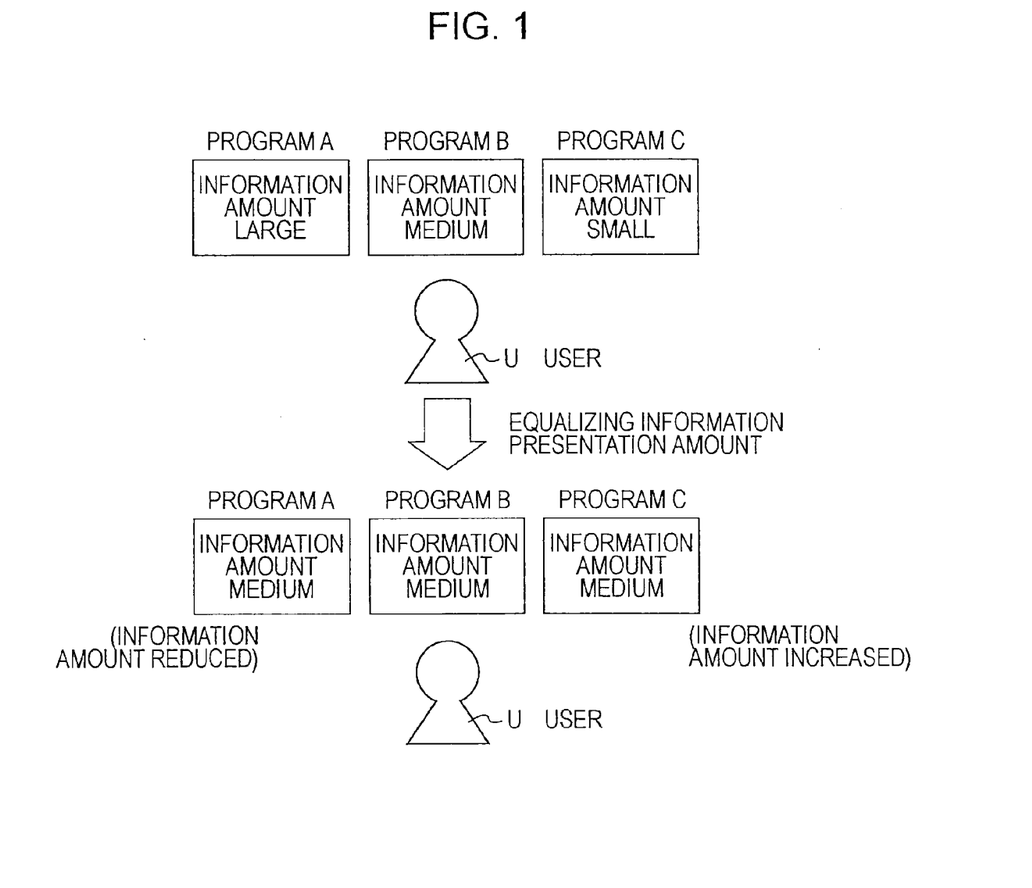
FIG. 1 is an explanatory diagram illustrating an overview of a system according to an embodiment of the present invention.

An overview of a system in the present invention is illustrated in FIG. 1. When a plurality of programs (or reproduction video images) A, B, and C are viewed concurrently on a plurality of screens (display devices), the information amount generally varies in the individual programs or reproduction video images, generating a deviation of information among the screens. Note that, the information amount as used herein does not mean the absolute amount thereof but the relative amount of information (or whether the information amount is greater or less) among the plurality of screens.

In the present invention, in such a case, a stimulus that changes presentation information temporarily is applied by using such a range and a method that a user (viewer) U is not aware of the stimulus, and data on the response of the user U at that time (hereinafter referred to simply as a "response") is measured. Then, on the basis of the measurement result, a deviation of information amount in each screen is estimated, and reproduction speeds are adjusted in real time so as to equalize the information amounts in the individual screens by reducing the information amount for a screen that is presenting a large amount of information and by increasing the information amount for a screen that is presenting a small amount of information. In this way, it is made possible that the user U obtains information efficiently from the plurality of screens.

Figure 2:
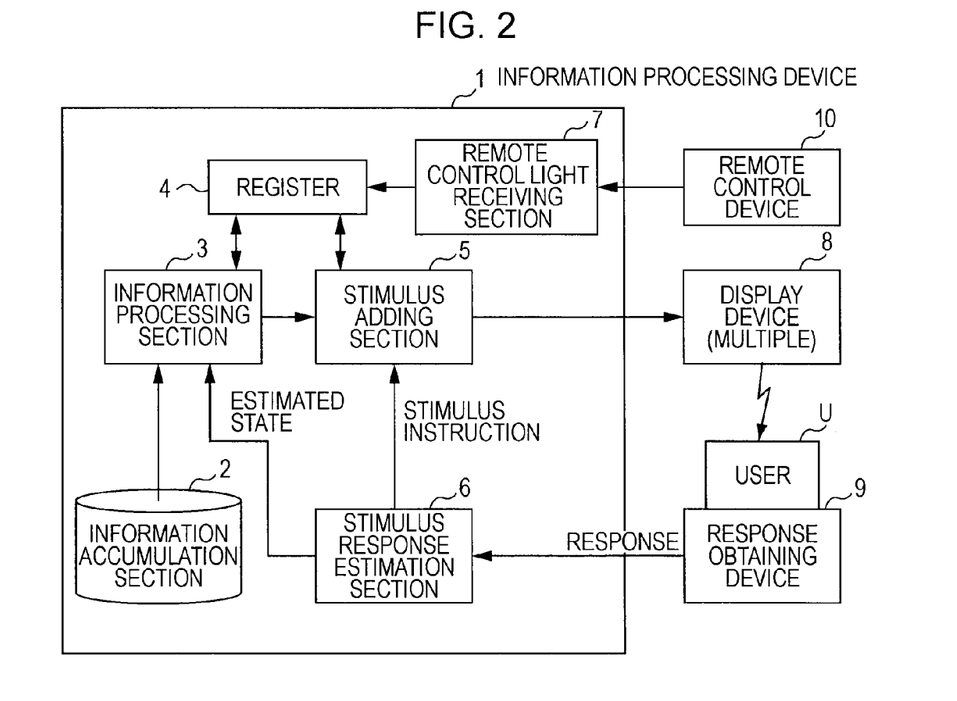
FIG. 2 is a block diagram illustrating an example of an internal configuration of the system according to the embodiment of the present invention.

An example of an internal configuration of the system according to the embodiment of the present invention will be described with reference to a block diagram illustrated in FIG. 2. An information processing device 1 illustrated in FIG. 2 obtains a response of the user U input from a response obtaining device 9, adjusts the amount and content of information to be presented on (a plurality of) display devices 8 on the basis of the response, and receives a remote control signal from a remote control device (hereinafter referred to as a "remote control") 10. In this information processing device 1, an information accumulation section 2, an information processing section 3, a register 4, a stimulus adding section 5, a stimulus response estimation section 6, and a remote control light receiving section 7 are included.

The information accumulation section 2 is formed of, for example, a HDD (Hard Disc Drive), and stores and accumulates information such as video images encoded by an encoding/decoding processing section that is not shown. The information accumulation section 2 inputs a plurality of information items (for the number of display devices) read therefrom to the information processing section 3.

The information processing section 3 is formed of, for example, a microcomputer or the like, and performs processing on the information read from the information accumulation section 2 and predetermined control in order to perform presentation on the display devices 8. For example, the information processing section 3 performs processing to determine which information item is to be presented on which display device 8 among the plurality of display devices 8, and performs processing to determine a reproduction speed of the information item to convert the information item to the reproduction speed. Furthermore, since an internal state (a response to a presented information item) of the user U is obtained from the stimulus response estimation section 6 described later, the information processing section 3 performs processing on information on the basis of the state of the user U. Then, the processed information is input to the stimulus adding section 5.

The stimulus adding section 5 adds a stimulus to information output from the information processing section 3 when an instruction to add the stimulus is provided from the stimulus response estimation section 6. Examples of a stimulus include changing the reproduction speed, increasing the brightness of a video image, changing the size of a video image (screen size), and turning up the volume. Then, the stimulus adding section 5 respectively inputs individual information items including information to which a stimulus has been added to the plurality of display devices 8, and presents the information items to the user U.

The display device 8 on which information is presented includes a plurality of display devices and is formed of, for example, a liquid crystal display or the like.

The response obtaining device 9 is means for measuring a response to the presented information such as a body movement of the user U. This response obtaining device 9 may be of a contact type or a non-contact type. Examples of an object to be measured (movement of the user U) include a movement of line-of-sight of the user U, a face movement, and a movement of the swivel chair on which the user U sits. The measured response of the user U is input to the stimulus response estimation section 6.

The stimulus response estimation section 6 estimates an internal state of the user U from the relationship between the stimulus applied to the presentation information and the response thereto obtained from the user U. Examples of an internal state to be estimated include the information amount presented (determined by the subjectivity of the user U), and preference, physical condition, and feeling of the user U. The estimated state is sent to the information processing section 3 and the state of the user U is fed (given) back to the information presentation.

The register 4 is a storage element (storage means) used in operations and in retaining of execution conditions, and, in this example, is used to retain presentation target information indicating which information is to be presented on which display device, a type of stimulus mode described later, a stimulus value such as a reproduction speed, or the like.

The remote control light receiving section 7 receives ultraviolet light (a remote control signal) input from the remote control device 10, converts it into an electric signal, and sends the electric signal to the register 4. Information items such as presentation target information, a stimulus mode, and a reproduction speed are input to the register 4 to cause the information processing section 3 or the stimulus adding section 5 to perform a predetermined operation.

The remote control device 10 is configured to perform communication by using communication means (remote control signal) such as ultraviolet light. When a predetermined operation key of the remote control device 10 is operated, ultraviolet light emitted from the remote control device 10 is received by the remote control light receiving section 7 of the information processing device 1, and predetermined processing is performed. In this embodiment, a stimulus mode or the like can be specified for the information processing device 1 by using the remote control device 10. The communication method of the remote control device 10 may be of a wireless type or a wired type, or may be a radio frequency method such as Bluetooth (registered trademark).

Figure 3:
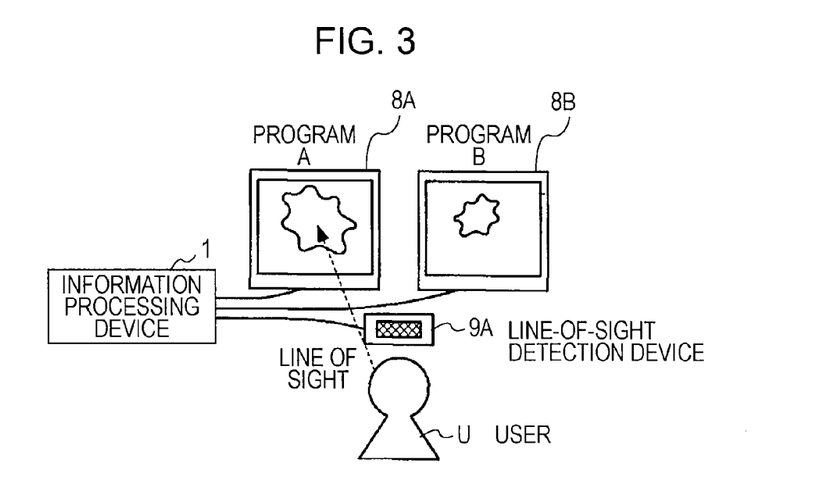
FIG. 3 is an explanatory diagram of the system according to the embodiment of the present invention.

An example of a system configuration of the embodiment of the present invention is illustrated in FIG. 3. In this embodiment, two display devices 8A and 8B are disposed in front of the user U and respectively present a program A and program B concurrently. It is assumed that the user U views the programs in order to efficiently obtain information from the two programs. Note that a case of two screens (two display devices) is described in the present embodiment, but the present embodiment is also applicable to a case of three or more screens as illustrated in FIG. 1 as a matter of course.

In the present embodiment, movement of the line-of-sight of the user U is measured by a line-of-sight detection device 9A, whereby information of which screen is being viewed can be obtained. This line-of-sight detection device 9A is one example of the response obtaining device 9 illustrated in FIG. 2. The line-of-sight detection device 9A detects the position of the line-of-sight of the user U from the position of the eyes of the user U. The disposition of the line-of-sight detection device 9A is made at a position where the line-of-sight of the user U can be easily detected, such as a position facing the user U. Note that, as the line-of-sight detection device 9A, a floor-mounted type device, a view-detection-glass type device to be worn by the user U, and so on are available. Alternatively, the position of the line-of-sight of the user U may be detected by a monitoring camera installed at a distance.

For example, while the user U is viewing a video image (program A) displayed on the display device 8A and when a video image (program B) of more interest or that is more stimulating is displayed on the display device 8B, the line-of-sight will move from the program A displayed on the display device 8A to the display device 8B on which the video image (program B) of more interest is being displayed. That is, in this case, the line-of-sight of the user U will move from the display device 8A to the display device 8B next thereto. The line-of-sight obtaining device 9A detects the position of the line-of-sight or the movement of the line-of-sight of the user U in such a moment and sends the detection result to the stimulus response estimation section 6.

Here, the amount of a so-called "view time deviation E" is defined. It is assumed that there is a number N of display devices and each of the display devices is viewed for Tn (n=1, . . . , N) seconds out of t seconds. The view time deviation E is a standard deviation of view time Tn of the individual display devices. In a case where only a certain display device is viewed for a long time or where there is a display device that is hardly ever viewed, the view time deviation E increases. The view time deviation E increases when there is a variation in the information amount presented on each of the display devices.

Figure 4:
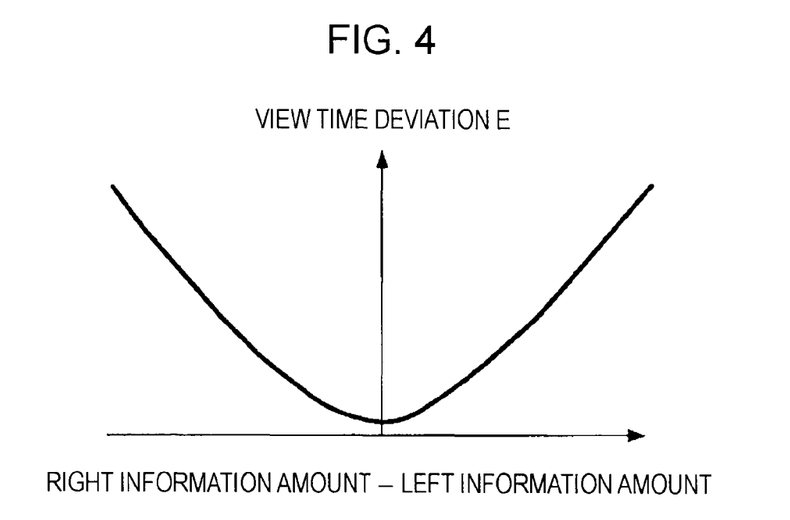
FIG. 4 is an explanatory diagram illustrating an example of the relationship in the view time deviation between two screens according to the embodiment of the present invention.

An overview of an example of the relationship in the view time deviation E between two screens is illustrated in FIG. 4. In FIG. 4, a difference between the information presentation amount presented on the right screen (display device 8B) and the information amount presented on the left screen (display device 8A) is plotted along the abscissa, and the view time deviation E is plotted along the ordinate. The characteristic of the view time deviation E in a two-screen case represents a curved line having a downwardly convex shape. As the information presentation amount of one of the left and right screens increases (around both edges of the graph), the user U more often watches the screen having a large information presentation amount, whereby the view time deviation E increases. In contrast, when there are few differences in the information presentation amounts (around the center of the graph), the user U evenly watches the two screens, whereby the view time deviation E decreases. In a case where the view time deviation E is small, the user U can evenly view the left and right screens and thus it is considered that a high efficiency is attained in terms of obtaining information. Consequently, in the present embodiment, the information presentation amount for each display device is adjusted so as to reduce the view time deviation E.

Next, a method for determining increase or decrease of the information amount to be presented on the screens of the display devices 8A and 8B will be described. In an attempt to reduce the view time deviation E, it is not sufficient to simply increase or decrease the reproduction speeds in accordance with the amounts of the view time Tn of the aforementioned display devices 8A and 8B. When the view time Tn of one of the display devices is smaller than that of the other display device, two possibilities are conceivable.

(1) The information amount presented on the one of the display devices is so small that the user U does not watch the display device often.

(2) The information amount presented on the one of the display devices is so large that the user U cannot obtain the information amount and thus does not watch the display device at all.

Figure 5:
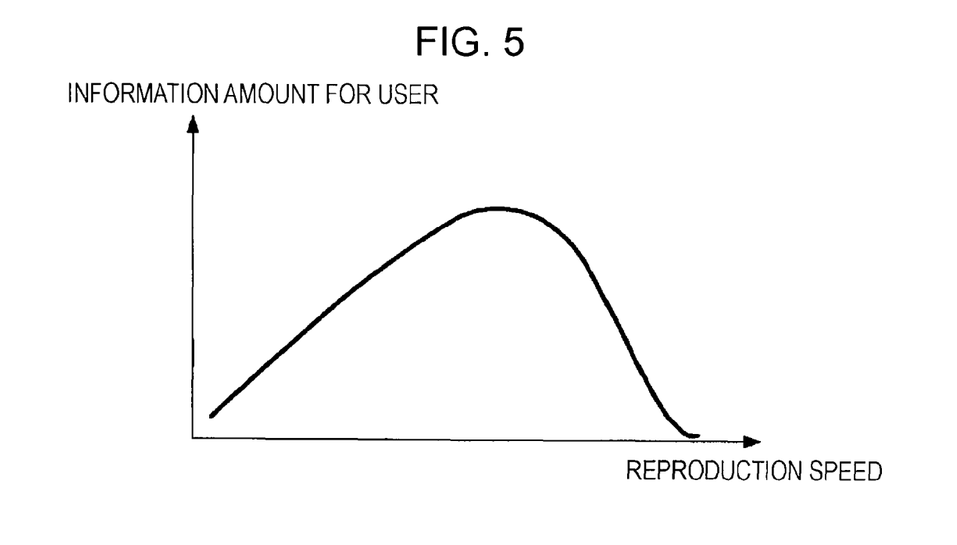
FIG. 5 is an explanatory diagram illustrating an example of the relationship between reproduction speed and information amount for a user according to the embodiment of the present invention.

Now, an example of the relationship between the reproduction speed and the information amount for the user U is illustrated in FIG. 5. In FIG. 5, the reproduction speed of information presented is plotted along the abscissa and the information amount (obtained information amount) for the user U is plotted along the ordinate. The characteristic curve of the information amount for the user U represents a curved line having a generally upwardly convex shape. The information amount that the user U can obtain per unit of time increases as the reproduction speed increases, and the information amount that the user U can obtain reaches the peak at a certain reproduction speed. Then, once the reproduction speed exceeds the limit of the ability of the user U to understand the information, the information amount that the user U can obtain decreases even when the information amount presented is increased by increasing the reproduction speed.

From the characteristic curve of the information amount for the user U illustrated in FIG. 5, the following measures for handling the cases where the view time Tn of a display device is small are conceivable. In the case (1) described above, since the information amount presented is small, the information amount can be increased by increasing the reproduction speed. In contrast, in the case (2) described above, reducing the reproduction speed allows the user U to obtain the information more easily and thus the information amount for the user U can be increased. Since determination of which one of the reasons (1) and (2) the reason the view time Tn of a display device is small corresponds to cannot be made by simply observing the view time deviation E or the view time Tn, it is necessary to perform determination by using the stimulus response estimation section 6.

Figure 6:
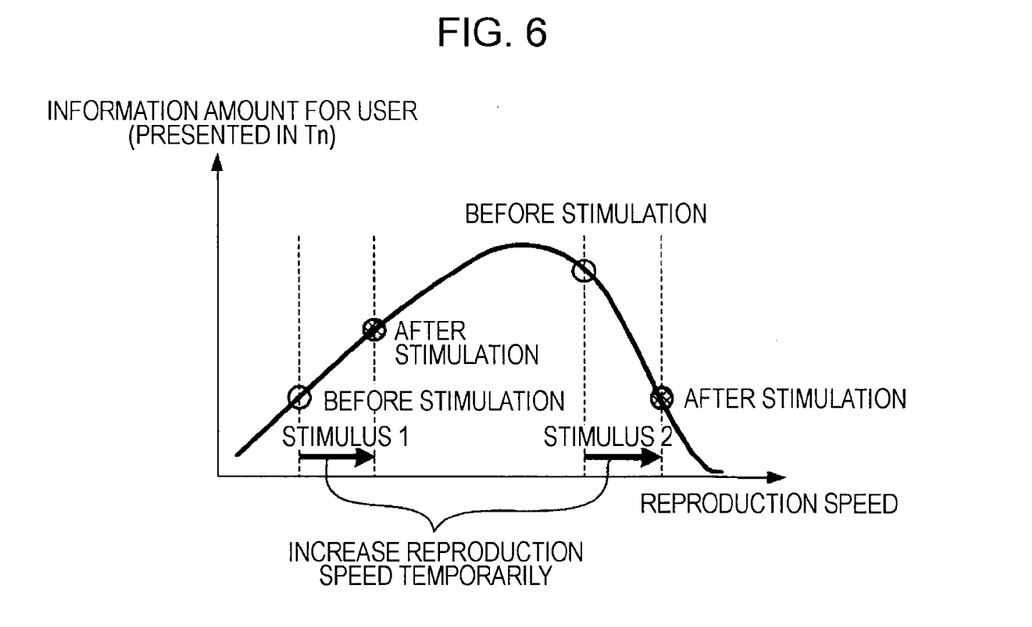
FIG. 6 is an explanatory diagram illustrating an example of a change in response before/after stimulation according to the embodiment of the present invention.

FIG. 6 is a diagram for explaining the determination method, which illustrates an example of the relationship between pre-stimulus responses and post-stimulus responses. In FIG. 6, the reproduction speed of information presented is plotted along the abscissa and the information amount (obtained information amount) for the user U is plotted along the ordinate. In the present embodiment, the determination is carried out by applying a stimulus that changes the reproduction speed temporarily. By comparing the view time Tn of the display device before a stimulus application with the view time Tn of the display device after the stimulus application, the relationship between increase or decrease of the reproduction speed and increase or decrease of the information amount that the user U felt is determined. The length of the view time Tn can be used as an indicator or a standard for the size of the information amount that the user U obtains.

For example, for a case of "stimulus 1" (a positive gradient, increasing to the right) illustrated in FIG. 6, since the view time Tn increases after the stimulus which increases the reproduction speed temporarily is applied, it is understood that it is sufficient to increase the reproduction speed in order to increase the information amount that the user U obtains. On the other hand, for a case of "stimulus 2" (a negative gradient, decreasing to the right), since the view time Tn decreases after the stimulus is applied, it is understood that reducing the reproduction speed can increase the information amount for the user U.

Therefore, in a case where reduction in view time deviation E is desired, it is sufficient that the view time deviations E of before and after a stimulus application are compared to determine whether the stimulus makes the view time deviation E increase or decrease, and the reproduction speed of information to be presented on the display device is set so that the view time deviation E decreases.

Next, operations of the stimulus response estimation section 6 of the information processing device 1 will be described. By using the aforementioned method, the stimulus response estimation section 6 changes the reproduction speed temporarily (applies a stimulus), monitors a change of the line-of-sight (response) of the user U at that time, and estimates the direction of increase or decrease of the reproduction speed in order to reduce the deviation in the information amount that the user U feels between the individual screens.

Figure 7:
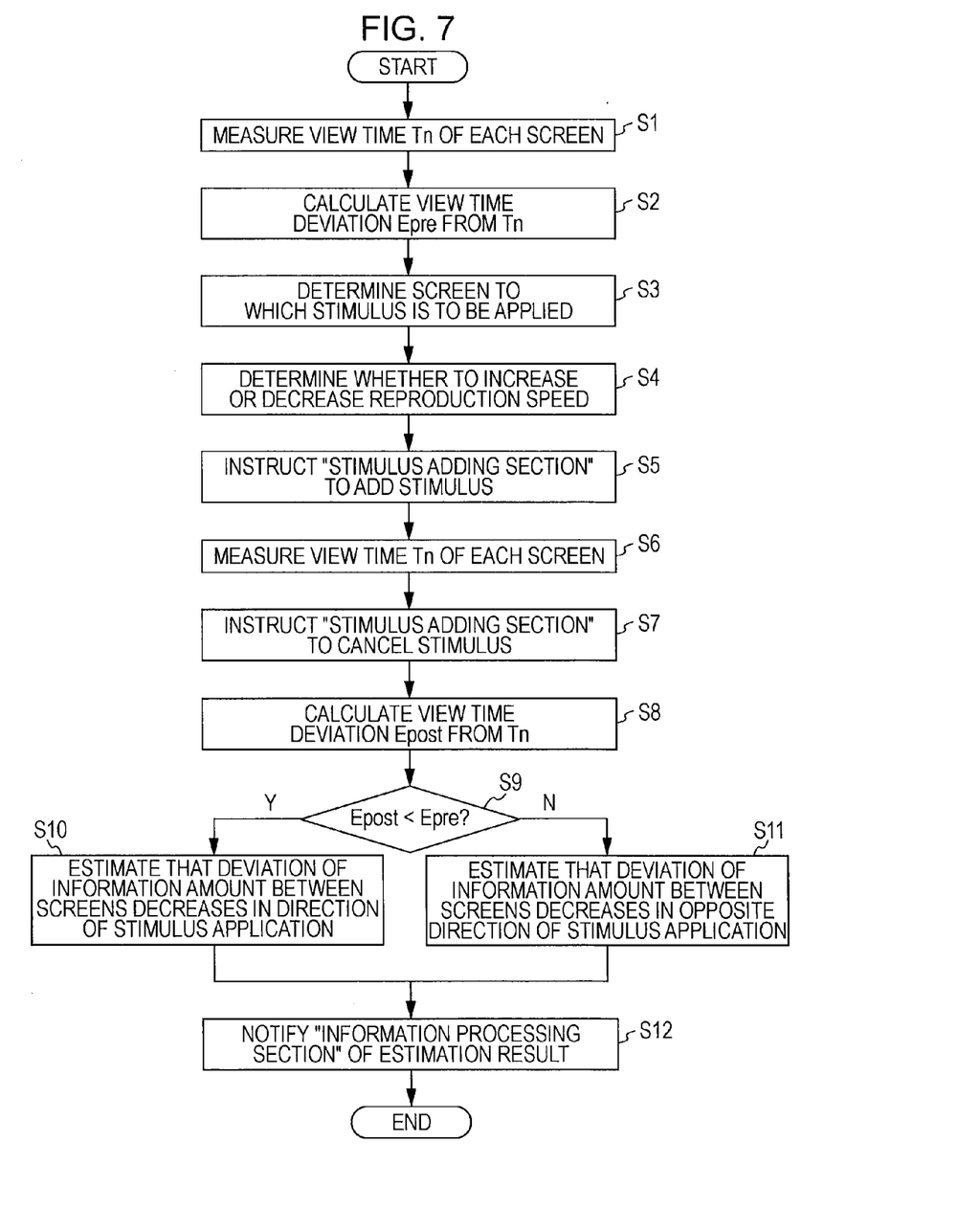
FIG. 7 is a flowchart illustrating an example of processing of a stimulus response estimation section according to the embodiment of the present invention.

An example of processing performed by the stimulus response estimation section 6 will be described with reference to the flowchart of FIG. 7. First, before a stimulus is applied, the proportion of time the user U spent viewing the individual screens (a view time Tn of each screen) is measured on the basis of information from the response obtaining device 9 (step S1). Next, from the measured view time Tn of each screen, a view time deviation Epre is calculated in accordance with the aforementioned definition (such as a standard deviation) (step S2).

Next, a screen to which a stimulus (change in reproduction speed) is to be applied is selected (step S3). This screen may be one with the longest view time Tn or one with the shortest view time Tn, or may be selected at random. In addition, whether the reproduction speed is to be increased or decreased as the stimulus is determined (step S4). For this step, a rule may be established, for example, to increase the reproduction speed or the like for the case where a screen with the shortest view time Tn is selected, or whether to increase or decrease of the reproduction speed may be determined at random.

Then, the stimulus adding section 5 is notified of the stimulus determined by the processing in step S4 from the stimulus response estimation section 6 to instruct the stimulus adding section 5 to add the stimulus to information to be output to the display device 8 (step S5). When the stimulus adding section 5 applies the stimulus (changing the reproduction speed temporarily) to the information to be output to the display device 8, the stimulus response estimation section 6 measures the view time Tn of each screen during that period (step S6).

After the measurement of view time Tn of each screen has been completed, an instruction is issued to the stimulus adding section 5 to cancel the stimulus (step S7) to finish the stimulus addition. Next, from the measured view time Tn of each screen, a view time deviation Epost for the stimulus application period is calculated (step S8). Then, the view time deviation of post-stimulus-application Epost is compared with the view time deviation of pre-stimulus-application Epre (step S9).

Here, if the view time deviation of post-stimulus-application Epost is smaller than the view time deviation of pre-stimulus-application Epre, it is estimated that the applied stimulus has reduced the deviation of information amount between the screens (step S10). In contrast, if the view time deviation of post-stimulus-application Epost is larger than the view time deviation of pre-stimulus-application Epre, it is estimated that a stimulus of a direction opposite to that of the applied stimulus (stimulus of decreasing the reproduction speed in a case where the stimulus of increasing the reproduction speed has been applied) will reduce the deviation of information amount between the screens (step S11). The stimulus response estimation section 6 notifies the information processing section 3 of the estimation result (step S12). In the information processing section 3, the estimation result is reflected in the information presentation so as to reduce a difference of the information amounts between the screens that the user U feels. By repeating the above-described operations, a deviation of the information amount between the screens (display devices) can be reduced.

Figure 8:
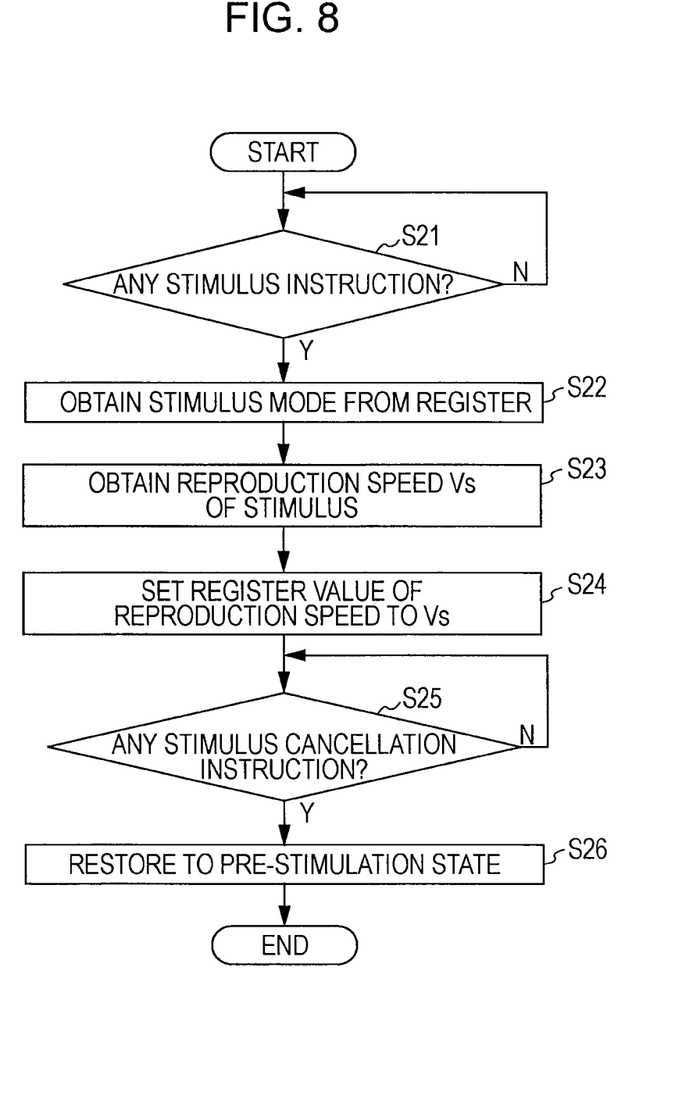
FIG. 8 is a flowchart illustrating an example of processing of a stimulus adding section according to the embodiment of the present invention.

Next, an example of processing performed by the stimulus adding section 5 of the information processing device 1 will be described with reference to the flowchart of FIG. 8. First, the stimulus adding section 5 determines whether or not an instruction of adding a stimulus has been provided by the stimulus response estimation section 6 (step S21). If an instruction of adding a stimulus has been provided, the stimulus adding section 5 obtains a stimulus mode from the register 4 in which setting contents can be changed on the basis of a remote control signal from the remote control device 10 or the like (step S22). In a case where the stimulus mode obtained from the register 4 is a "reproduction speed conversion mode" setting, a specified reproduction speed Vs is obtained from the stimulus response estimation section 6 as described above (step S23), and a register value is set to Vs by writing the reproduction speed Vs to the register 4 (step S24). Then, the reproduction speed of information to be presented on the screen (display device) is changed to Vs by using the information processing section 3.

The value of the above-mentioned reproduction speed Vs is determined so as to be a speed faster than the current reproduction speed or a speed slower than the current reproduction speed on the basis of the stimulus instruction from the stimulus response estimation section 6.

The stimulus adding section 5 determines whether or not an instruction of canceling the stimulus has been provided from the stimulus response estimation section 6 (step S25). At this time, if an instruction of canceling the stimulus has been provided, the reproduction speed of information to be output to the display device is restored to the pre-stimulus state (step S26) to cancel the stimulus.

Note that other stimulus modes retained in the register 4 are a "brightness conversion mode", a "sound volume conversion mode", a "screen size conversion mode" or the like. For example, in the processing in step S22, when the stimulus adding section 5 obtains the brightness conversion mode from the register 4, the stimulus adding section 5 obtains a specified brightness Bs from the stimulus response estimation section 6 and sets the register value to Bs by writing the brightness Bs to the register 4. Then, the brightness of information to be presented on the screen (display device) is changed to Bs by using the information processing section 3. After the brightness conversion is completed, the flow proceeds to processing in step S25.

In the same manner, when the stimulus adding section 5 obtains the sound volume conversion mode from the register 4, the stimulus adding section 5 obtains a specified sound volume Ls from the stimulus response estimation section 6 and sets the register value to Ls by writing the sound volume Ls to the register 4. Then, the sound volume of a reproduction video image which is information to be presented on the screen (display device) is changed to Ls by using the information processing section 3. After the sound volume conversion is completed, the flow proceeds to processing in step S25.

In addition, when the stimulus adding section 5 obtains the screen size conversion mode from the register 4, the stimulus adding section 5 obtains a specified screen size Ss from the stimulus response estimation section 6 and sets the register value to Ss by writing the screen size Ss to the register 4. Then, the screen size of information to be presented on the screen (display device) is changed to Ss by using the information processing section 3. After the screen size conversion is completed, the flow proceeds to processing in step S25.

Figure 9:
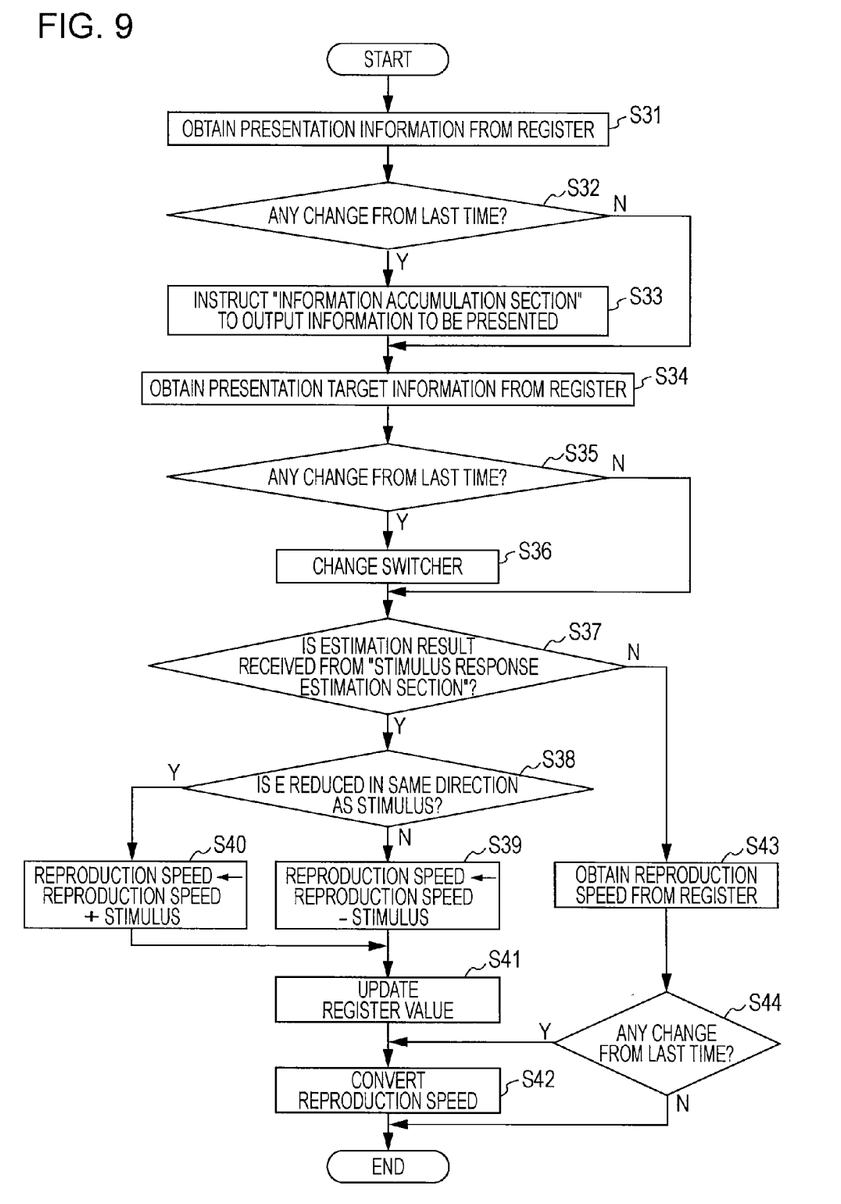
FIG. 9 is a flowchart illustrating an example of processing of an information processing section according to the embodiment of the present invention.

Next, an example of processing performed by the information processing section 3 of the information processing device 1 will be described with reference to the flowchart of FIG. 9. An example illustrated in FIG. 9 is an example of a case where the reproduction speed conversion mode has been set. First, the information processing section 3 obtains presentation information indicating the content of information to be presented on a target display device from the register 4 (step S31). The information processing section 3 checks whether or not the content retained in the register 4 has been changed. For example, determination is made as to whether or not there has been a change of the content from the information presented last time (step S32). If there has been a change in the presented information, an instruction is issued to the information accumulation section 2 to output information to be presented (step S33). If there has been no change in the presented information, the flow proceeds to processing in step S34.

Next, presentation target information, that is information indicating a screen (display device) on which information is to be presented, is obtained from the register 4 (step S34). Then, determination is made as to whether or not there has been a change of the screen of the presentation target from last time (step S35). If there has been a change of the presentation target, a switcher (switching section) that is not shown in the information processing section 3 is switched (step S36) to change the presentation target of information. If there is no change of the presentation target, the flow proceeds to processing in step S37.

In addition, the information processing section 3 determines whether or not an estimation result regarding the internal state of the user U has been received from the stimulus response estimation section 6 (step S37). If an estimation result has been received, the information processing section 3 determines whether or not the information amount deviation E between the screens has been reduced in a direction according to the direction in which a stimulus is applied (step S38). If the information amount deviation E between the screens has not been reduced, the current reproduction speed is replaced with a reproduction speed to which a stimulus (variable) of reducing the information amount deviation in a direction opposite to the direction in which the stimulus was applied has been added (step S39). On the other hand, if the information amount deviation E between the screens has been reduced, the current reproduction speed is replaced with a reproduction speed to which a stimulus (variable) of further reducing the information amount deviation in the direction in which the stimulus was applied has been added (step S40). Then, the reproduction speed after the conversion in step S39 or S40 is input to the register 4 to update the register value (step S41), and thereby convert the reproduction speed of information to be presented on the display device (step S42).

Further, in the determination processing in step S37, if an estimation result has not been received by the information processing section 3 from the stimulus response estimation section 6, the reproduction speed of information is obtained from the register 4 (step S43). Then, a determination is made as to whether or not an instruction of changing the reproduction speed from that of the presentation last time has been provided from the stimulus adding section 5 (step S44). If there has been a change, the flow proceeds to processing in step S42, and if there has been no change, the series of the processes ends.

In this manner, in the example of FIG. 9, the information processing section 3 checks whether there has been a change in the content of the register 4. When there has been a change, information to be presented, a display device of the presentation target, a reproduction speed for presentation and so on are updated. In addition, when an estimation result is received from the stimulus response estimation section 6, the information processing section 3 changes the reproduction speed or the like of information to be presented on the basis of the received estimation result so as to reduce the information amount deviation E between the screens.

According to the configurations and the processes of the present embodiment described above, the amount or content of information to be presented can be adjusted so as to provide an appropriate information presentation for the user U by temporarily changing the display content of a display device (screen) and obtaining a response of the user U at that time.

Further, an internal state of the user U can be estimated without burdening the user U since an involuntary response to a change in the information amount or content of the information to be presented on the display device is obtained.

Furthermore, by using a plurality of display devices (screens), responses of the user U can be obtained easily and the responses can be limited to responses that can be easily analyzed.

Note that, in the above-described embodiment, information to be presented on a display device may be non-video images, such as still images and text information such as caption text. In addition, in the above-described embodiment, a case where a plurality of display devices is used has been described. However, it is possible to, for example, divide the display screen of one display device into multiple display areas and determine a deviation of an information amount of a video image or the like among the divided display areas to determine a variable such as a reproduction speed and a display area to perform display at a reproduction speed to which the variable is applied.

EXPLANATION OF REFERENCE NUMERALS

1 information processing device, 2 information accumulation section, 3 information processing section, 4 register, 5 stimulus adding section, 6 stimulus response estimation section, 8, 8A, 8B display device, 9 response obtaining device, 9A line-of-sight detection device, 10 remote control.

The invention claimed is:

1. An information presentation device comprising:
circuitry configured to:
    output video images with settings based on variables respectively provided to individual display sections of a plurality of display sections; and
    determine which display section, of the plurality of display sections, in which a setting of a video image is to be changed, determine the setting to be changed in accordance with response information of a viewer obtained by a response obtaining device, the response obtaining device configured to obtain a response of the viewer in response to a stimulus applied to a video image output to any of the plurality of display sections, and output information of the display section in which the setting of the video image is to be changed and a variable specifying the setting of the video image, wherein:

the stimulus includes a change in reproduction speed, volume, video image brightness, and a screen size of the video image; and the response of the viewer includes a change in a line-of-sight, a facial movement, and a body position movement.

2. The information presentation device according to claim 1, wherein the circuitry is configured to determine a deviation between an information amount of a video image, to which the stimulus is applied, displayed on a first display section and an information amount of a video image displayed on a second display section which is placed adjacent to the first display section on the basis of the response information of the viewer obtained by the response obtaining device, and estimate an information amount of the display section in which the setting of the video image is to be changed and the setting of the video image in accordance with the determination result.

3. The information presentation device according to claim 2, wherein the circuitry is configured to determine the deviation between the information amount of the video image displayed on the first display section and the information amount of the video image displayed on the second display section on the basis of a time in which the viewer views the video image displayed on the first display section and a time in which the viewer views the video image displayed on the second display section.

4. The information presentation device according to claim 3, wherein in a case where the deviation between the information amounts of the video images displayed on the first display section and the second display section has been reduced, it is estimated that the deviation between the information amounts is to be further reduced by applying a variable having a same direction as a direction in which the setting of the video image was changed, and in a case where the deviation between the information amounts of the video images dis played on the first display section and the second display section has not been reduced, it is estimated that the deviation between the information amounts is to be further reduced by applying a variable having an opposite direction to a direction in which the setting of the video image was changed.

5. The information presentation device according to claim 4, wherein the circuitry is further configured to:

apply the stimulus to the video image to be outputted to a predetermined display section on the basis of a stimulus adding instruction.

6. The information presentation device according to claim 5, wherein the setting of the video image is a setting of the reproduction speed of the video image to be output to the display section, and a magnitude of the reproduction speed is determined by a value of the variable.

7. An information presentation method comprising:

a step of outputting video images with settings based on variables respectively provided to individual display sections of a plurality of display sections from an information processing section;

a step of applying a stimulus to a video image output to any display section from the information processing section;

a step of obtaining response information of a viewer obtained by a response obtaining device that obtains a response of the viewer in response to the stimulus applied to the video image; and a step of determining, by a stimulus response estimation section, which of the plurality of display sections in which a setting of a video image is to be changed and the setting to be changed in accordance with the response information of the viewer, and outputting information of the determined display section in which the setting of the video image is to be changed and a variable based on the setting to be changed from the stimulus response estimation section to the information processing section, wherein:

the stimulus includes a change in reproduction speed, volume, video image brightness, and a screen size of the video image; and the response of the viewer includes a change in a line-of-sight, a facial movement, and a body position movement.

8. The information presentation device according to China 1, wherein the display section in which the setting of the video image is to be changed is different from the video image to which the stimulus is applied.

9. The information presentation device according to claim 1, wherein the setting to be changed and the variable specifying the setting is selected so as to equalize an information amount presented in each of the plurality of display sections.

* * * * *